Sept. 10, 1940.          F. H. GOODING          2,213,983
APPARATUS FOR ELECTRICALLY MEASURING THE WALL THICKNESS OF METAL TUBING
AND FOR CONTROLLING THE WALL THICKNESS
Filed July 12, 1938          6 Sheets-Sheet 1

Francis H. Gooding, INVENTOR
BY Riddle, Bushell and Montgomery
ATTORNEYS

Patented Sept. 10, 1940

2,213,983

UNITED STATES PATENT OFFICE 2,213,983

APPARATUS FOR ELECTRICALLY MEASURING THE WALL THICKNESS OF METAL TUBING AND FOR CONTROLLING THE WALL THICKNESS

Francis H. Gooding, Lodi, N. J., assignor to The Okonite-Callender Cable Company, Incorporated, Paterson, N. J., a corporation of New Jersey Application July 12, 1938, Serial No. 218,736

6 Claims. (Cl. 207—2)

This invention is directed to improved equipment for electrically measuring the wall thickness of tubular members and to equipment for the promotion of the production of tubular members of constant thickness around the circumference.

While my invention is adapted for electrically measuring the wall thickness of all types of metal tubing, it is particularly well adapted for electrically measuring the wall thickness of cable sheaths, and for clarity of description will be described in this connection.

It might be pointed out that in the sheathing of electric cables, for example, not only is it desirable that the sheath wall be of constant thickness around the sheath circumference, but the buyers of such equipment specify a minimum thickness, and it is not unusual under present practice to find some point in the cable where the thickness of the sheath may be as much as 15% or 20% below the minimum specified. For instance, a 125 mil sheath can easily run down to 100 mils at some point in the sheath circumference, so that the sheath is then no stronger than if the whole sheath were 100 mils thick. Inasmuch as these thin areas but rarely occur at the ends of the cable their existence is readily overlooked.

The present invention provides for continuously indicating and recording sheath conditions so far as wall thickness is concerned as the sheath is being manufactured.

One embodiment of my invention provides for the continuous indicating and recording of per cent variations from an average thickness at a plurality of points about the sheath periphery; an extension of this idea provides for continuously indicating and recording differences in sheath thickness at opposite points on the sheath periphery; still another embodiment of my invention provides for continuously indicating and recording actual sheath thickness at four points about the sheath periphery; while a further extension of my invention not only provides for indicating and recording actual sheath thickness but provides, also, for the automatic control of the heating of the die block of the lead press so as to produce a sheath the wall of which is of uniform thickness about the circumference of the sheath throughout the entire sheath length.

In the accompanying drawings:

Fig. 4A is simply an enlarged view of the face of one of the indicating and recording potentiometers shown on Fig. 4;

Figure 1:
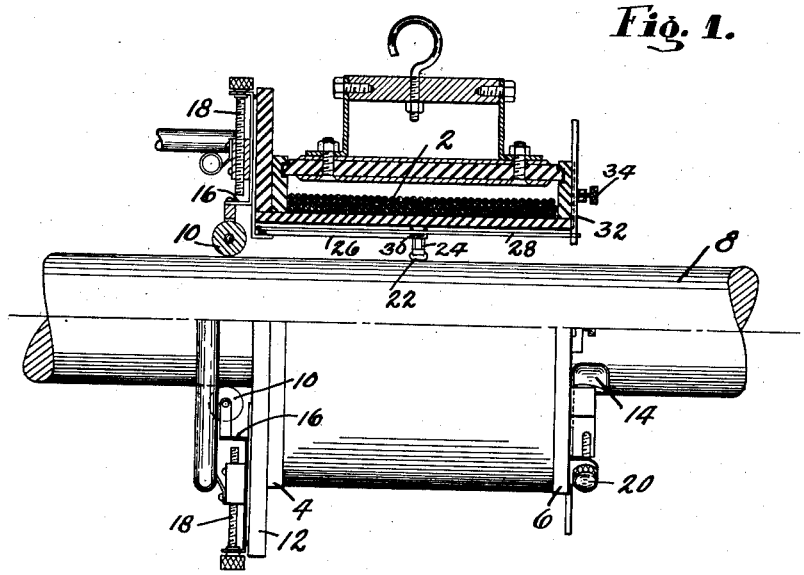
Fig. 1 is a part sectional elevational view of an exciting coil constituting part of the equipment used in the practice of my invention.
Figure 2:
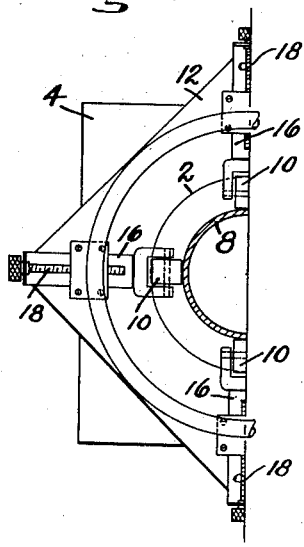
Fig. 2 is a half view of the left hand end of the apparatus of Fig. 1.

Referring to the drawings in detail and first of all to the embodiment of my invention illustrated in Figs. 1 to 4A, inclusive.

My improved apparatus comprises an exciting coil 2 carried in end plates 4 and 6 and mounted concentrically with respect to metal sheath or other tubular member 8, the coil being spaced from the sheath by four rollers 10 mounted on a plate 12 at one end of the coil and by four slides 14 mounted on the plate 6 at the other end of the coil.

The rollers 10 are carried by brackets 16 capable of being individually adjusted by knurled screws 18 properly to center the coil with respect to the tube 8. The slides 14 may also be individually adjusted by knurled screws 20.

The coil assembly, in practice, is hung from a pulley and counterbalanced with a suitable weight. This facilitates handling and reduces sheath marking as well as wear on the rollers. I also propose to anchor the coil against forward movement with suitable anchoring means such as a heavy wire which may be hooked to the frame of a lead press, for instance.

It will be understood that the rollers 10 and slides 14 are for the purpose of steadying the coil and for maintaining the coil 2 concentric with the sheath 8.

The exciting coil carries four pairs of contacts 22 which continuously contact the sheath when my equipment is in operation. Each pair of contacts is mounted on a holder 24 attached to a strip 26, each of these strips being fastened to a bracket on the roller assembly.

Pressure is applied to each pair of contacts by means of a steel wire 28 which is supported loosely at the roller end of the coil and passes through at frame 30 above each set of contacts and through a strip 32 at the slide end of the coil. The strip 32 can be locked in adjusted position by means of a screw 34 to give the desired pressure of the contacts on the sheath 8. This arrangement of the contacts is practically self-aligning and gives good contact on the cable sheath at all times. It will be understood, of course, that the contacts are intermediate the coil and sheath. The conductors for the contacts are closely twisted, drawn into tubing and finally run into a ring shaped pipe 36 at the roller end of the coil.

Figure 4:
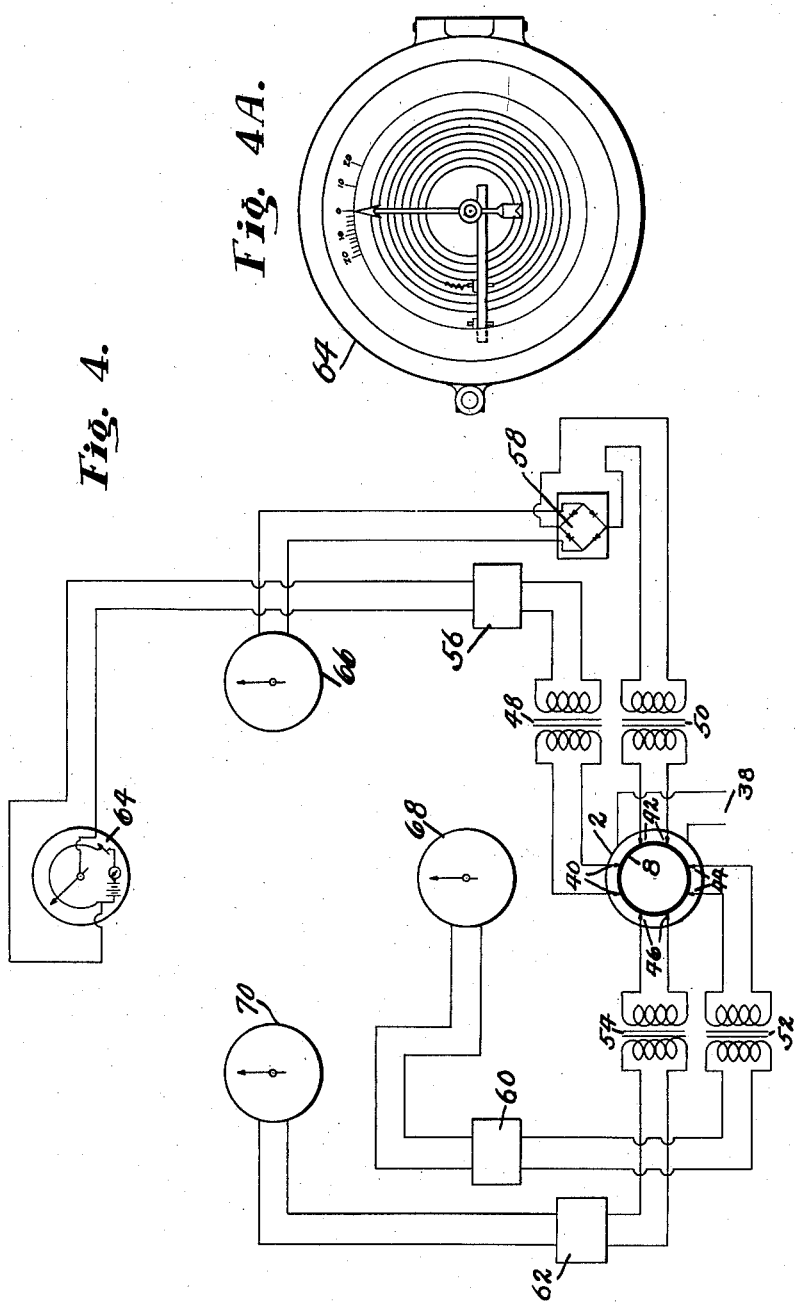
Fig. 4 is a wiring diagram or layout of one embodiment of my invention wherein I continuously indicate and record per cent variations from an average wall thickness.

The coil 2 is excited from any suitable source of power, as shown at 38 on the wiring diagram of Fig. 4, as for example a source of 220 volt 60 cycle alternating current.

Figure 3:
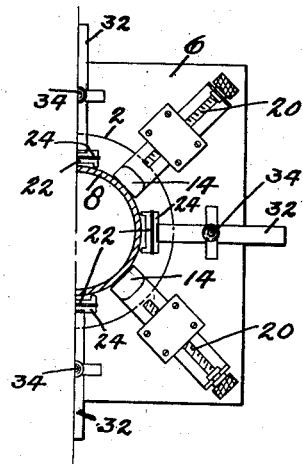
Fig. 3 is a similar view of the right hand end of the apparatus of Fig. 1.

Referring now more particularly to the wiring diagram of Fig. 4, the contacts which have all been designated 22 in Figs. 1 and 3 will be given a new number for the purpose of clarity of description. The contacts resting upon the upper side of the sheath or tube 8 in this figure of the drawings will be designated 40; those at the right hand side of the sheath, 42; those at the bottom of the sheath, 44; and those at the left hand side of the sheath, 46. The contacts 40, 42, 44 and 46 are connected to one side of a transformer 48, 50, 52 and 54, respectively. These transformers can conveniently be mounted on the bracket which supports the coil.

The voltage output of the transformer 48 goes to a bridge type rectifier designated 56 which is connected across the transformer secondary; the output side of the transformer 50 to bridge type rectifier 58; the output side of transformer 52 to bridge type rectifier 60; and the output side of transformer 54 to bridge type rectifier 62.

The rectifiers 56, 58, 60 and 62 are connected in turn to indicating and recording potentiometers 64, 66, 68 and 70, respectively.

The theory of operation of my invention is based on the unequal distribution of potential difference around the circumference of a nonuniform metal tubing, such, for example, as a lead sheath, in which a current is circulated. The circulating current in this embodiment of my invention above described is induced in the advancing sheath 8 by current flowing in the coil 2 which, as above pointed out, is energized, for example, from a 220 volt 60 cycle alternating current power supply 38.

It will be apparent that if the advancing tubing or sheath 8 is of uniform thickness, as the sheath advances within the coil 2, the potential is induced uniformly around the sheath so that the potential induced in the section of sheath lying between the contacts 40 will be equal to that induced in the section of sheath lying between the contacts 42, between the contacts 44 and between the contacts 46, and is absorbed uniformly around the sheath so that no voltage will be measurable across any of these sheath sections. This is on the assumption, as above pointed out, that the sheath is of the same thickness around its circumference. If, on the other hand, the sheath 8 is not of uniform thickness, although potential is induced uniformly around the sheath it is absorbed non-uniformly, then it will be apparent that there will be a measurable difference of voltage across the sheath sections between the contacts 40, or contacts 42, 44 or 46, which will be proportional to the amount by which the resistance of any of said sheath sections varies from the average resistance, thereby to induce a current in the secondary of the transformers connected across the contacts, this current after rectification by rectifiers 56, etc., actuating the indicating and recording potentiometers 64, 66, 68 and 70. Inasmuch as each of these potentiometers is an indicating potentiometer as well as a recording potentiometer, the operator by watching the same will be able to know that the sheath is "out", that is to say, is not of uniform wall thickness around the circumference of the sheath. The potentiometers will be marked, for example "top," "bottom," "right side," "left side," so that the operator will be able to identify that part of the sheath which is either too thick or too thin and can adjust the burners on his lead press accordingly.

This embodiment of my invention, it will be appreciated, indicates a per cent variation from average thickness of sheath at four separate points in the sheath periphery, that is, the parts of the sheath lying between the contacts 40, between the contacts 42, between the contacts 44 and between the contacts 46.

Figure 5:
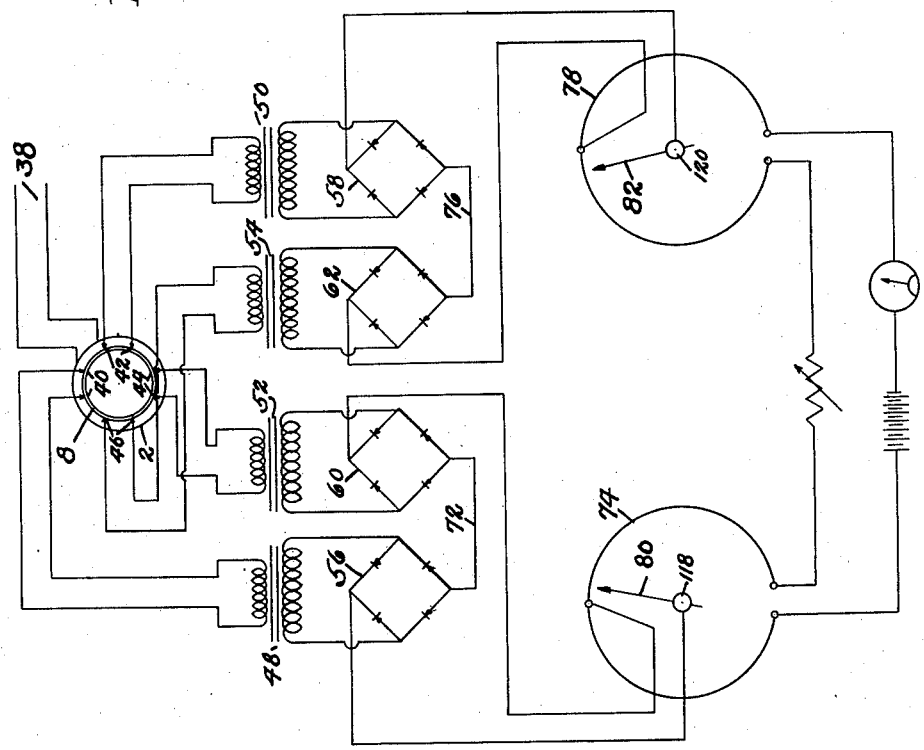
Fig. 5 is a wiring diagram or layout of that embodiment of my invention wherein I continuously indicate and record differences in wall thickness at opposite points on the sheath periphery.

In the embodiment of my invention shown in Fig. 5 I have provided for indicating and recording differences in sheath thickness at opposite points in the sheath instead of per cent variation from average thickness. For simplicity and clarity of description the same reference characters will be applied to this figure of the drawings as have been employed in connection with Fig. 4.

With reference to the diagram of Fig. 5, the sheath 8 is surrounded by a coil 2 the same as in Fig. 4. Contacts 40 rest upon the upper side of the sheath 8; contacts 42 upon the right hand side of the sheath; 44 upon the lower side of the sheath; and 46 rest upon the left hand side of the sheath. These contacts are mounted on the frame of the coil 2 as described hereinabove in connection with Figs. 1 to 4, for example.

The contacts 40, 42, 44 and 46 are connected to the primary side of the transformers 48, 50, 52 and 54, respectively, and bridge type rectifiers 56, 58, 60 and 62, respectively, are connected to the secondary of these transformers. The rectifiers 56 and 60, corresponding to the top and bottom of the sheath 8, are connected to each other as shown at 72 but so that the voltage outputs of the bridge rectifiers are in opposition, and this voltage difference is applied to an indicating and recording potentiometer 74, while the rectifiers 58 and 62, corresponding to the right and left sides of the sheath are similarly connected together as shown at 76 and to an indicating and recording potentiometer 78.

With this embodiment of my invention in operation it will be apparent that a difference in thickness around the circumference between that part of the sheath lying between the contacts 40 and that part of the sheath lying between the contacts 44, top and bottom, respectively, of the sheath, will effect operation of the potentiometer 74. Deflection of the movable element 80 of this potentiometer to the left, for instance, indicates that the top of the sheath is too light or too thin; deflection of the element 80 to the right indicates that the bottom of the sheath between the contacts 44 is too light or too thin. The operator can then adjust the heating elements of his lead press accordingly.

Likewise with respect to the potentiometer 78 movement of the indicating element 82 to the right indicates that the section of the sheath between the contacts 42 is too light or too thin and movement of this element to the left indicates that the section of sheath between the contacts 46 is too light or too thin.

With this embodiment of my invention, due to the fact that one potentiometer is connected through two rectifiers which are connected in opposition to each other and in turn connected across the secondary of two separate transformers, one of which transformers is connected to the contacts 40 at the top of the sheath, the other to contacts 44 at the bottom of the sheath, a reading will be obtained on the potentiometer 74 by reason of a difference in thickness between a section of the sheath lying between the contacts 40 and the section of the sheath at the bottom lying between the contacts 44. For the same reason the poteniometer 78 will indicate and record a difference in thickness between a section of the sheath lying between the contacts 42 at the right hand side of the sheath and the contacts 46 at the left hand side of the sheath.

In the arrangement just described it will now be apparent that the potentiometer 74 will indicate at any instant the difference in sheath thickness between top and bottom of the sheath, while the potentiometer 78 will give the same information at any instant with respect to the sheath thickness at opposite sides of the sheath.

Figure 6:
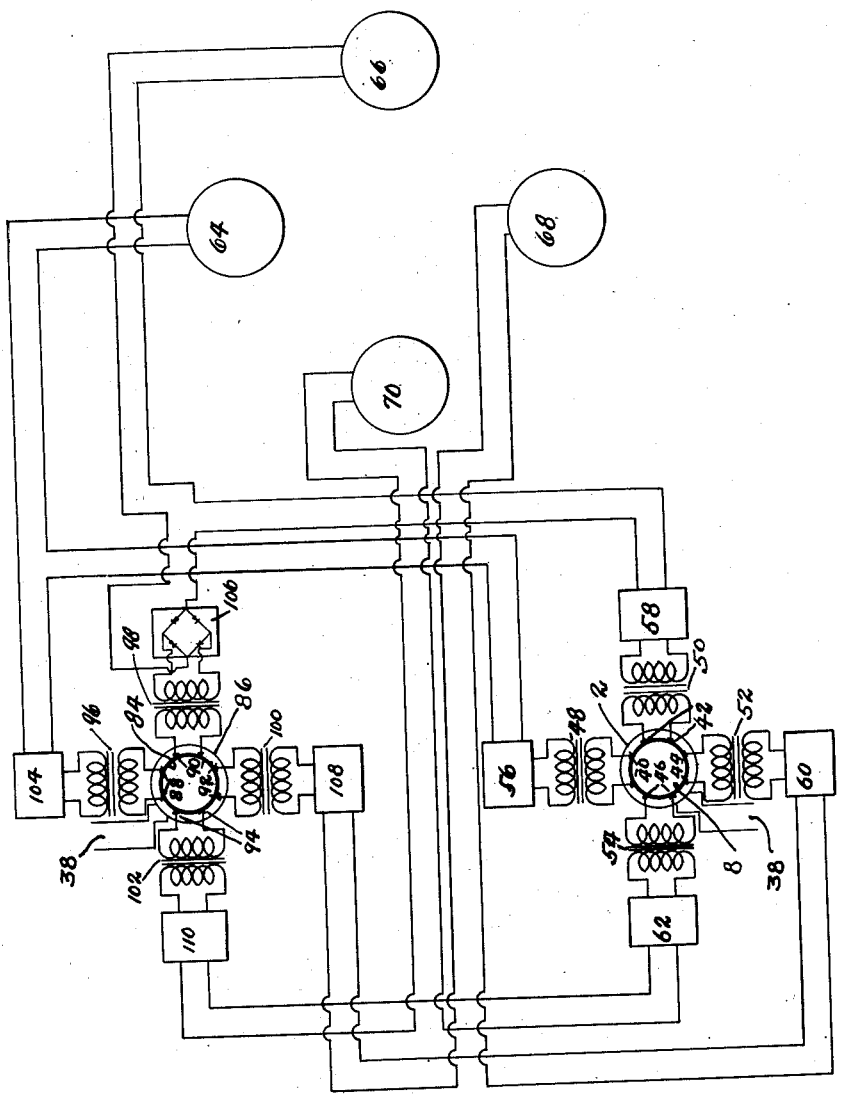
Fig. 6 is a wiring diagram or layout of an embodiment of my invention wherein I continuously indicate and record actual wall thickness at a plurality of points about the sheath periphery.

In the embodiment of my invention illustrated in Fig. 6 I have provided an arrangement for indicating and recording actual thickness of the sheath at four points around the circumference of the sheath. In this arrangement I employ a master sheath which I will designate 84, the thickness of this master sheath, of course, being uniform. This sheath will be surrounded by a coil 86 which is identical with the coil 2 surrounding the sheath 8, the two coils being connected in series and therefore carrying the same current. Contacting the sheath 84 are pairs of contacts 88, 90, 92 and 94 at the top, right hand side, bottom and left hand sides, respectively, of the master sheath or pipe 84. As in the other embodiments of my invention already described, pairs of contacts 40, 42, 44 and 46 engage the sheath 8 at top, right hand side, bottom and left hand side, respectively. The contacts 88, 90, 92 and 94 of the master pipe 84 are connected to transformers 96, 98, 100 and 102, respectively.

The secondary of each of these transformers is connected to a rectifier of the bridge type such as referred to in connection with Figs. 4 and 5, for instance, designated 104, 106, 108 and 110, respectively, and one side of these rectifiers is connected to potentiometers 64, 66, 68 and 70, respectively. All of these potentiometers 64, 66, 68 and 70, are of the recording and indicating type. The other side of the rectifier 104 is connected to one side of the rectifier 56 which is across the transformer 48 connected to the contacts 40, the other side of the rectifier 56 being connected to the potentiometer 64, the direction of the connections being such that the output voltages of the bridge rectifiers are in opposition. The other side of the rectifier 106 is connected to one side of the rectifier 58 connected across the transformer 50 for the contacts 42; the other side of this rectifier 58 being connected to the potentiometer 66. Here again the direction of the connections is such that the output voltages of the bridge rectifiers are in opposition. The other side of the rectifier 108 is connected to one side of the rectifier 60 connected across the transformer 52 for the contacts 44, the other side of this rectifier 60 being connected to the potentiometer 68, the output voltages of the two rectifiers being in opposition. The other side of the rectifier 110 is connected to one side of rectifier 62 across the transformer 54 for the contacts 46, the other side of this rectifier 62 being connected to the potentiometer 70, and the direction of the connections being such that the output voltages of the rectifiers are in opposition.

It will be apparent that with this arrangement the potentiometer 64 will indicate and record the difference in thickness between that part of the master pipe or sheath 84 lying between the contacts 88 and the thickness of that part of the sheath 8 lying between the contacts 40. It will be apparent also that with this arrangement the indicating and recording potentiometers 64, 66, 68 and 70 will indicate and record the difference in thickness of the master sheath 84 and the sheath 8 at the right side, left side and bottom of the sheaths. It will be understood, of course, that the thickness of the master tubing or sheath is already known from micrometer measurements so that the potentiometers can be calibrated in mils thickness.

Figure 7:
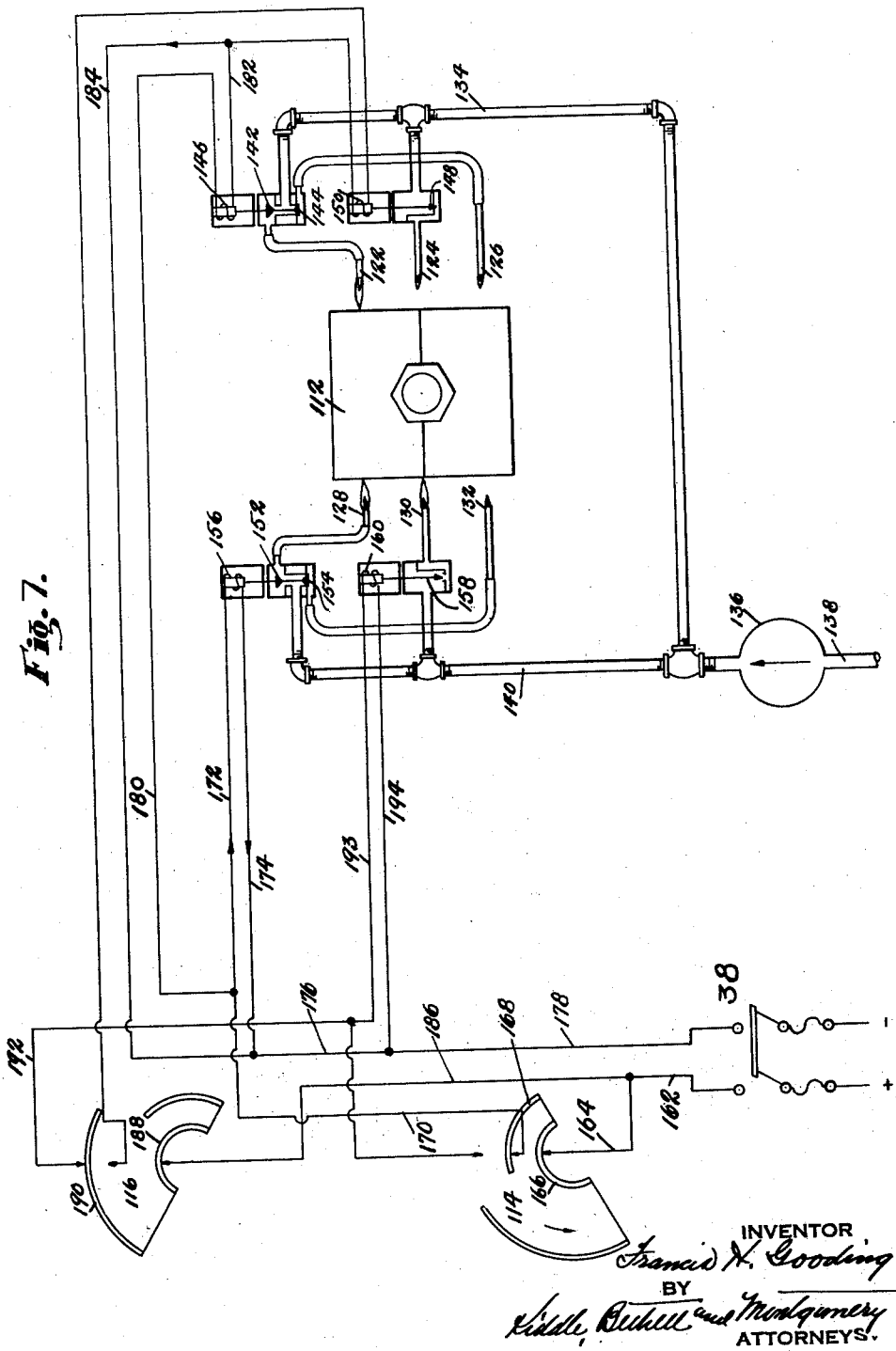
Fig. 7 is a diagram of an arrangement whereby the heating of the lead press may be automatically controlled.

In the embodiment of my invention illustrated in Fig. 7 I have illustrated a construction wherein I propose automatically to control the heating of the die block 112 of a lead press when the invention is employed in connection with the extruding of lead sheaths. To avoid repetition and to simplify the drawings, I have shown in Fig. 7 two commutator switches 114 and 116 and these commutator switches are mounted on the main shafts 118 and 120, respectively, of the two potentiometers 74 and 78 of Fig. 5.

As above explained, the potentiometer 74 of Fig. 5 indicates a difference in sheath thickness at top and bottom while the potentiometer 78 indicates a difference in thickness between the sides of the sheath.

Adjacent the die block 112 of the lead press I provide gas nozzles 122, 124, 126, 128, 130 and 132. The nozzles 122 to 126 are connected through valve mechanism to gas line 134 which branches from a gas booster pump 136 connected to gas main 138. The nozzles 128 to 132 are connected to gas pipe 140 which also leads from the booster pump 136. The flow of gas to the nozzles 122 and 126 is controlled by two valves 142 and 144 on the one valve stem which is adapted to be actuated by coil 146. The flow of gas to the nozzle 124 is controlled by a valve 148 which is adapted to be actuated by coil 150. The nozzle 122 is near the top of the sheath coming through the die block, the nozzle 124, at the right hand side of the sheath and the nozzle 126, near the bottom of the sheath. The nozzles 128, 130 and 132 are on the opposite side of the die block to the nozzles 122 to 126 and the flow of gas through the nozzles 128 and 132 is controlled by valves 152 and 154 on a single stem actuated by coil 156 while the flow of gas through the nozzle 130 is controlled by valve 158 actuated by coil 160. The valves 158 and 148 are operated independently of each other.

As the parts are shown in Fig. 7, the valves 142, 152 and 158 are in open position, the valves 154, 144 and 148 being closed, so that gas can flow through the line 134, past the valve 142 to the gas nozzle 122 which, as above noted, is near the top of the die block at one side of the die block. The valve 152 being open gas can also flow to the nozzle 128 which is in line with the nozzle 122 but on the opposite side of the die block. The valve 158 being open gas can also flow to the nozzle 130 which is at the left hand side of the die block about midway of the same.

This is the setting under an assumed condition where the left side and top of the sheath being extruded are too thin or too light, necessitating increasing the temperature of the die block at the top and the left side, it being understood, of course, that by heating one point of the block more than another more lead will flow to that point, so that the thickness of the extruded sheath becomes greater at that point. Under these conditions the shaft 118 of the potentiometer 74 has moved to the left so that the commutator switch 114 is rotated to close a circuit to the coils 146 and 156. The circuit for the coil 156 may be traced from one side of the line, conductors 162, 164, switch segments 166, 168, conductors 170, 172, coil 156, conductors 174, 176, 178 to the other side of the line.

Energizing of the coil 156 will, of course, open the valve 152 so that gas can flow to the nozzle 128 at the left side of the die block near the top thereof, and at the same time close the valve 154 controlling the flow of gas to nozzle 132.

The circuit to the coil 146 may be traced by way of conductor 180, branching from the conductor 170, coil 146, conductors 182 and 184, 176, 178, to the other side of the line.

Energizing of the coil 146 opens the valve 142 so that gas can flow to the nozzle 122 to the right hand side of the die block near the top, at the same time closing valve 144 controlling the flow of gas to nozzle 126.

The potentiometer 78 has moved the commutator switch 116 so that a circuit is closed at this time to the coil 160 for the valve 158. This circuit may be traced by way of conductors 162, 186, switch segments 188, 190, conductors 192, 193, coil 160, conductors 194, 178, to the other side of the line. Gas is now free to flow past the valve 158 to the nozzle 130.

It is believed that it is unnecessary to trace other circuits of this diagram, it being obvious from the drawing itself that movement of the switches 114 and 116 in the opposite direction by the potentiometers 74 and 78 will deenergize the coils 156, 146 and 160, closing valves 152 and 158 and opening valves 142, 154 and 144 to admit gas to nozzles 132 and 126. At the same time the coil 150 will be energized to admit gas to nozzle 124.

Figure 8:
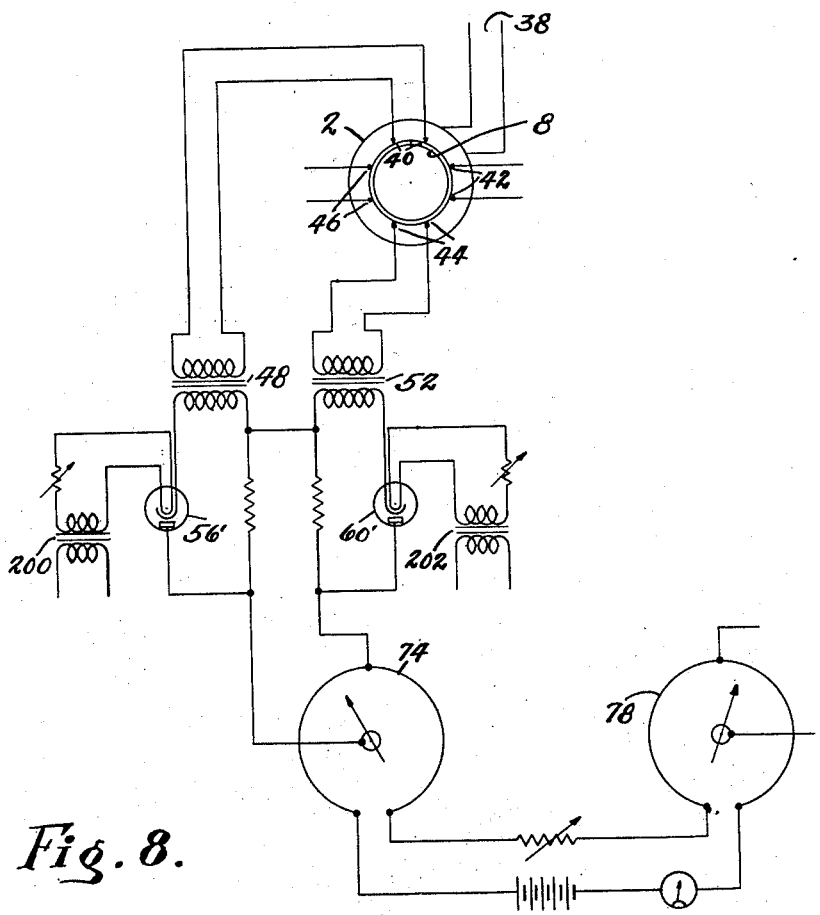
Fig. 8 is a wiring diagram of a modification of the arrangement shown in Fig. 5, for example.

The embodiment of my invention illustrated in the fragmentary diagram of Fig. 8 is quite similar to the construction described in connection with Fig. 5.

Referring to this embodiment of the invention: 8 designates the sheath or tubing and 2 the exciting coil surrounding the same. As in Fig. 5, contacts 40 and 44 are provided at the top and bottom, respectively, of the sheath, and contacts 42 and 46 at the right and left sides, respectively. In this embodiment of my invention tube rectifiers are substituted for the rectifiers 56, 60, 62 and 58 of Fig. 5. But two of these rectifiers have been shown, designated 56' and 60', corresponding to rectifiers 56 and 60, top and bottom of the sheath, respectively. The heating transformer for tube rectifier 56' is designated 200 and that for the rectifier 60' is designated 202.

The rectifiers 56' and 60' are connected to the transformers 48 and 52, respectively, and are also connected to each other similarly to the connection of rectifiers 56 and 60 to each other, that is to say, so that the voltage outputs of the rectifiers are in opposition, this voltage difference being applied to the centrepoint potentiometer 74.

It will be understood that two other rectifiers similarly connected to each other and to the transformers connected to the contacts 42 and 46 are provided in this embodiment of my invention, these rectifiers being connected to the potentiometer 78. The tube rectifiers are run at low voltage and hence low filament emission. Emission currents are balanced before applying voltage to the coil 2. The use of tube rectifiers is of advantage as compared with the rectifiers employed in Fig. 5 in that they do not deteriorate.

From all of the foregoing it will be seen that I have provided for the promotion of the production of tubular members of constant thickness around the circumference. It will be seen, furthermore, that I have provided also for automatically regulating the heat of the press where the tubular member is being formed.

It is to be understood that changes may be made in the details of construction and arrangement of parts herein illustrated and described within the spirit and scope of my invention.

What I claim is:

1. Apparatus for detecting variations in wall thickness about the circumference of tubular metal members, comprising means for inductively circulating current circumferentially in the tubular member, and an electrically operated indicating device for indicating differences in wall thickness at opposite points on the periphery of the tubular member.

2. Apparatus for detecting variations in wall thickness about the circumference of tubular metal members, comprising means for inductively circulating current circumferentially in the tubular member, pairs of contacts at opposite sides of the tubular member in electrical engagement therewith, transformers connected to said contacts, a rectifier connected to the output side of each transformer, the rectifiers for opposed pairs of contacts being connected to each other so that their voltage outputs are opposed, and an indicating and recording device connected to each pair of rectifiers.

3. Apparatus of the class described, comprising in combination an extrusion press, heating elements therefor, and means actuated due to variations in the wall thickness of a tube being extruded from said press for controlling said heating elements to correct said wall thickness.

4. Apparatus of the class described, comprising in combination an extrusion press for extruding a metal tube, heating elements for the press, indicating instruments for indicating variations in the wall thickness of the tube as the same is being extruded, and switches actuated by operation of said indicating instruments for controlling said heating elements.

5. Apparatus of the class described, comprising in combination an extrusion press for extruding a metal tube, heating elements, valves for controlling the fuel supply to said heating elements, instruments for registering variations in the wall thickness of the tube as the same is being extruded, and switches for controlling said valves, said switches being actuated by said instruments.

6. Apparatus of the class described, comprising in combination an extrusion press, heating elements therefor, an energizing coil, a tube being extruded by the press passing through said coil, indicating instruments electrically connected to the tube and actuated by current circulating therein for indicating variations in the wall thickness of the tube circumferentially of the tube, switches positively actuated by said instruments, and electrically operated valves controlled by said switches for controlling the operation of the heating elements thereby selectively to increase and decrease the heat applied to the press.

FRANCIS H. GOODING.